Figure 1:
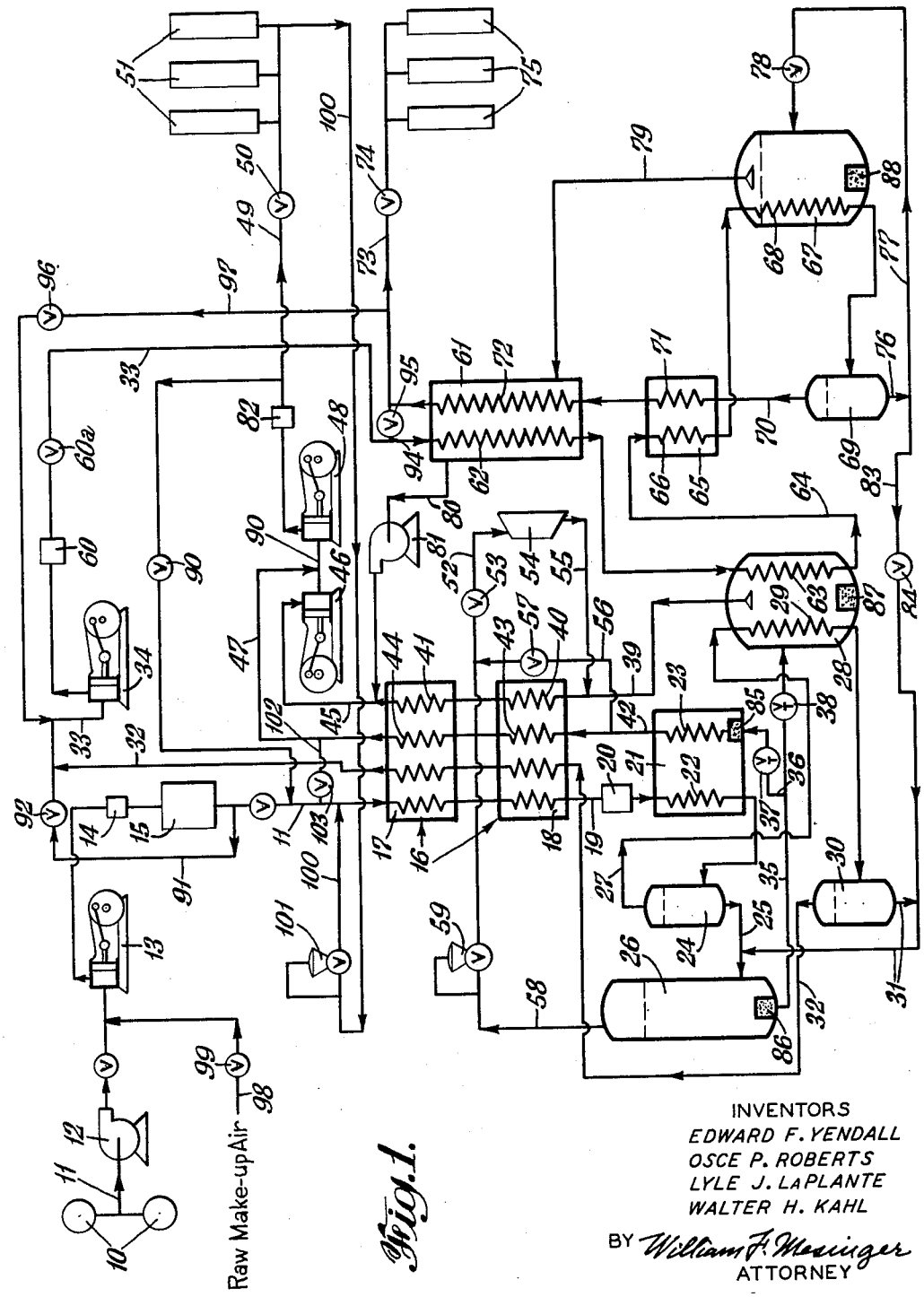

Oct. 9, 1962     E. F. YENDALL ET AL     3,057,167
PROCESS AND APPARATUS FOR SEPARATING
HELIUM FROM HELIUM-AIR MIXTURES
Filed Oct. 12, 1959     2 Sheets-Sheet 2

INVENTORS
EDWARD F. YENDALL
OSCE P. ROBERTS
LYLE J. LaPLANTE
WALTER H. KAHL
BY William F. Mesinger
ATTORNEY United States Patent Office 3,057,167
Patented Oct. 9, 1962

3,057,167
PROCESS AND APPARATUS FOR SEPARATING HELIUM FROM HELIUM-AIR MIXTURES
Edward F. Yendall, Buffalo, and Osce P. Roberts, Jr., Lyle J. La Plante, and Walter H. Kahl, Grand Island, N.Y., assignors to Union Carbide Corporation, a corporation of New York
Filed Oct. 12, 1959, Ser. No. 845,882
9 Claims. (Cl. 62—22)

This invention relates to the separation of helium-air mixtures into high purity helium and air components. More specifically, it relates to a process of and apparatus for the separation of helium-air mixtures into high purity helium and air components by employing successive stages of partial condensation with phase separation.

In recent years the need for a highly efficient system for recovering high purity helium from helium-air mixtures has increased rapidly. For example, helium-air mixtures are now used in supersonic wind tunnel installations to simulate certain temperature and pressure conditions for model testing in aircraft and missile development. Since helium is classed as a national resource and is in short supply, the preferred practice is to reclaim it for reuse. This requires use of suitable separation or purification process and apparatus.

Another area in which helium-air separation systems are employed is for repurifying the helium in dirigibles, into which air gradually diffuses with time.

The prior art has proposed numerous methods for separating helium-air mixtures, but all of these methods have serious limitations and disadvantages. For example, helium-air mixtures may be separated by selective adsorption in a liquid-air-temperature adsorbent bed, such as activated carbon or zeolitic molecular sieve. Unfortunately, this method entails high refrigeration losses and irreversibilities associated with the regeneration of an adsorbent bed.

The prior art has also employed staged reflux condensation of the helium-air feed mixture at successively colder temperatures in the liquid air range. Reflux condensation has been found to be inefficient and requires expensive and complicated equipment. The feed stream is usually compressed to high pressure, and a separate refrigeration system utilizing throttling or work expansion is provided.

Another limitation of the prior art separation schemes is their lack of reflexibility in processing helium-air mixtures of varying compositions. In wind tunnel installations employing such mixtures, it has been found desirable to use relatively low and relatively high helium concentrations to simulate various atmospheric conditions. Accordingly, a completely satisfactory helium-air separation system should be capable of processing mixtures of virtually any proportions in a highly efficient manner.

A principal object of this invention is to provide a highly efficient system for separating high purity helium from a helium-air mixture. Another object of the invention is to provide a helium-air separation system which minimizes the refrigeration and power requirements.

Still another object is to provide a helium-air separation system which is capable of separating the component gases in virtually any proportions and in a highly efficient manner.

Other objects of the invention will become apparent from the ensuing description and the appended claims.

Figure 2:
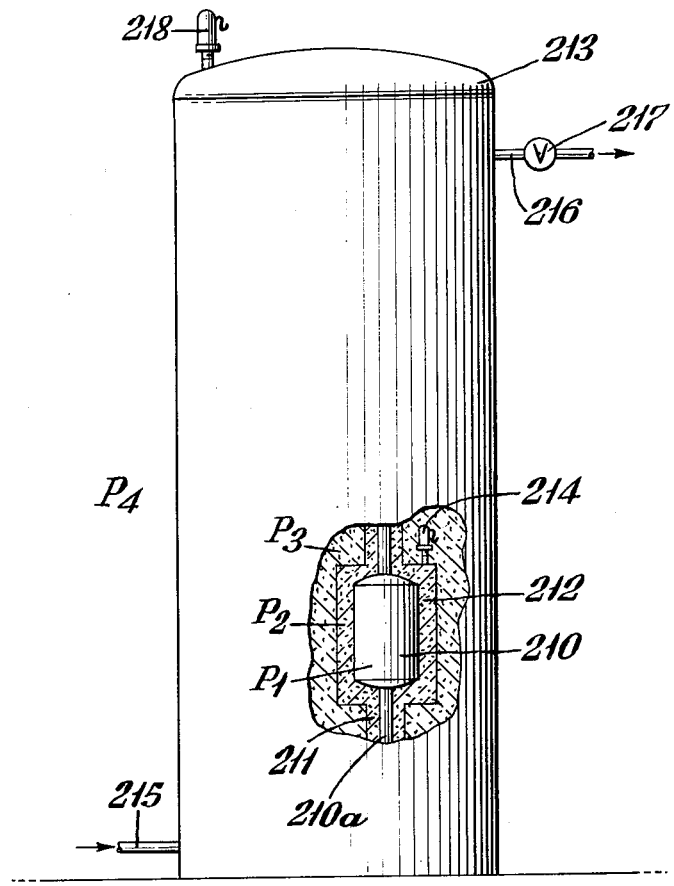

In the drawings:

FIG. 1 is a schematic diagram of a process for separating helium-air mixtures according to the present invention; and FIG. 2 is a schematic drawing taken in longitudinal elevational cross section of a novel insulating jacket adaptable for use with the coldest components of the FIG. 1 process.

In the present invention various mixtures of helium and air are separated into high-purity components by two stages of partial condensation. The primary stage operates at relatively low pressure and removes most of the air from the feed stream as condensed liquid. The crude gaseous helium thus obtained is further processed in a secondary stage at higher pressure for final purification. The necessary condensation temperatures are obtained in both separation stages by boiling the condensed air at successively lower pressures. Refrigeration for in-leakage of heat into the equipment and for heat losses due to temperature differences at the warm ends of the heat exchangers is supplied by work expanding at least part of the product air through an expansion turbine at a low temperature level. Any contaminants that are present as for example water, carbon dioxide and hydrocarbons, are preferably removed in a room temperature drier and oil traps to prevent fouling of the equipment and assure clean products to storage. Both the helium and air components of the feed stream may be recovered and preferably compressed for storage. The helium is of course recovered for its product use value; the air is preferably recovered because of its high purity and convenient availability for preparing new gas mixtures which for example may be used in a wind tunnel. Recovery of the air portion not only reduces the cost for air cleanup of water and carbon dioxide, but also conserves some helium that would otherwise be discarded in the air (about 1%).

Partial condensation has been found to be an extremely effective method of separating helium-air mixtures. By this method, air is condensed with reasonable completeness at a temperature and pressure at which the helium is essentially a non-condensable gas. The components condensed are then throttled to lower pressures where they ar boiled to provide refrigeration for subsequent condensing of the feed stream. This process is capable of handling any intermediate conditions of flow and feed concentrations within a reasonable separation time. The separation time is dependent upon the concentration and quantity of the feed mixture and upon the compressor capacity provided.

More specifically the present invention contemplates a process for separating a helium-air gas mixture into its components in which the mixture is provided at a first pressure, cooled to its dew point at such pressure, and then cocurrently partially condensed. The partially condensed mixture is then separated into a helium-enriched gas phase and an air-enriched liquid phase. The former gas phase is next further cocurrently partiallly condensed and separated into a helium further-enriched gas phase and a second air-enriched liquid phase. Such liquid phase is partially expanded and at least part of the resulting partially expanded fluid is passed in heat exchange with the cooled gas mixture for the cocurrent partial condensation step, thereby evaporating such fluid. The evaporated partially expanded air-enriched fraction and the helium further-enriched gas phase are passed in counter-current heat exchange with the helium-air inlet gas mixture as at least part of the cooling step to the gas mixture dew point. At least part of the evaporated partially expanded air-enriched fraction from the counter-current heat exchange is withdrawn at an intermediate thermal level of such heat exchange and work expanded with the production of low temperature refrigeration. The work expanded fraction is returned to the counter-current heat exchange for separate cooling of the inlet gas mixture. The resulting warm helium further-enriched gas phase is withdrawn from the warm end of the countercurrent heat exchange as a crude helium product, and the air-enriched fraction is also withdrawn from such warm end as the air product of the separation.

Referring now to FIG. 1, the helium-air feed gas mixture may be stored in collector spheres 10 and withdrawn through conduit 11 by vacuum pump 12 for compression in feed compressor 13 to a first pressure, as for example 165 p.s.i.a. and below. Oil may be removed from the compressed feed gas in trap 14, and water is removed in adsorbent trap 15, both traps being located in conduit 11. The clean gas is then cooled in heat exchange zone 16 to about its dew point which for example may be approximately 108° K. Heat exchange zone 16 preferably comprises warm leg exchanger 17 and cold leg exchanger 18 for reasons to be explained hereinafter. The cooled clean feed gas mixture is discharged from cold leg 18 into conduit 19, the latter preferably containing a second adsorbent trap 20 for removal of carbon dioxide thereby preventing such impurity from entering and contaminating the condensers located downstream. The saturated feed gas then enters the first cocurrent condenser 21 and flows through passageway 22 where at least part of the air is cocurrently condensed by heat exchange with boiling air in passageway 23. The resulting gas-liquid mixture is then separated in first separator 24 and the air-enriched liquid phase is withdrawn from the separator through conduit 25 to air-enriched storage tank 26. The helium-enriched gas phase from first separator 24 is vented through conduit 27 to the second cocurrent condenser 28 where most of the remaining air is condensed at about 85° K. in passageway 29 by boiling air at about 18 p.s.i.a. on the shell side of such condenser. The resulting gas-liquid mixture is then passed through conduit 27 to second separator 30 and the resulting second air-enriched liquid phase is withdrawn therefrom through conduit 31 for juncture with conduit 25 and passage to the air-enriched liquid phase storage tank 26. The helium further-enriched gas phase formed in second separator 30 is vented through conduit 32 and constitutes the crude helium product which for example may be 65–75% pure. The crude helium product in conduit 32 is passed through heat exchange zone 16 in countercurrent relation to the helium-air feed gas and serves to cool the latter. In this manner the refrigeration of the crude helium product gas is recovered and the resulting warmed crude helium is directed from conduit 32 to communicating conduit 33 for passage to the helium booster compressor 34 and subsequent further processing in the secondary separation stage, to be described hereinafter.

The air-enriched liquid phase in storage tank 26 is withdrawn therefrom through conduit 35 and preferably divided into two portions. One portion is diverted through conduit 36 and throttled through valve 37 to about 90 p.s.i.a. for flow through passageway 23 in first cocurrent condenser 21. A second portion of the air-enriched liquid fraction is directed through throttle valve 38 for pressure reduction to about 18 p.s.i.a., and subsequently boiled in second cocurrent condenser 28 to condense the feed gas streams. After being vaporized both air enriched streams are warmed independently to ambient temperature in heat exchange zone 16 so as to provide part of the refrigeration necessary to cool the inlet gas mixture to its dew point. More specifically the evaporated air fraction from second cocurrent condenser 28 is withdrawn through conduit 39 and directed to passageway 40 in cold leg 18, followed by flow through passageway 41 in warm leg 17. The evaporated ia rfraction from first cocurrent condenser 21 is discharged through conduit 42 and at least part thereof flows consecutively through passageways 43 and 44 of cold leg 18 and warm leg 17 respectively. The warmed air product fraction emerging from the warm end of passageway 41 is directed through conduit 45 to refrigerant compressor 46 and the gas discharged from such compressor is joined by the warm air product fraction having emerged from the warm end of passageway 44 into conduit 47. The composite air product fraction is then compressed in air booster compressor 48 and preferably passed through conduit 49 and control valve 50 therein to air product storage containers 51.

At least part of the 90 p.s.i.a. air product fraction in conduit 42 having emerged from passageway 43 is diverted at an intermediate temperature level of about 118° K. through branch conduit 52 and control valve 53 therein, and work expanded through turbine 54 to the pressure and temperature of the air emerging from second cocurrent condenser 28 in conduit 39. The work expanded product air is discharged from turbine 54 into conduit 55 and mixed with the low pressure air in conduit 39, upstream of cold leg 18. This work expansion supplies the necessary refrigeration for the separation system, and also supplies additional refrigeration to gradually build a supply of liquid air in storage tank 26 for future use to be described below. Another portion of the 90 p.s.i.a. product air fraction is bypassed around cold leg 18 from conduit 42 through conduit 56 and control valve 57 therein to the turbine inlet conduit 52, as required to regulate inlet and discharge temperatures. Also, evaporated air product from storage tank 26 is vented through conduit 58 and back pressure vent valve 59 to the turbine inlet conduit 52.

During most operating conditions the helium-air separation unit of the present invention preferably has excess refrigeration capacity. This excess capacity is used to liquefy air which is gradually accummulated in liquid storage tank 26. Some operational refrigeration requirements as well as all overnight and weekend heat leakage to the equipment are made up from this surplus liquid storage ballast. Liquid ballast aids in smoothing out operation when sudden changes in feed purities occur. For example, a ballast of liquid air is needed for a short period immediately following a sudden large increase in helium content of the feed gas.

The products from the primary separation stage are 73–75% purity helium and 99.5% pure air (containing about 0.5% helium). Crude product helium purity of 73–75% is determined by equilibrium condition with about 18 p.s.i.a. boiling temperature of liquid air in the second condenser 28. This helium product of intermediate purity is useful for some purposes, as for example model testing in wind tunnels, leak detection in large vessels, and as an easily reclaimed intermediate product from Heliarc welding systems.

In order to obtain the final desired high purity helium, a secondary separation system is provided which operates at pressures up to about 3,050 p.s.i.a. The crude helium from the primary separation is compressed to this pressure by helium booster compressor 34, cleaned of oil in trap 60 containing for example Fiberglas. The high pressure crude helium is then directed through conduit 33 to high pressure heat exchanger 61, and flows through passageway 62 for cooling to about its dew point temperature, e.g. 146° K. The cooled high pressure crude helium then passes to second cocurrent condenser 28 and passageway 63 therein where it is partially condensed by the previously described 18 p.s.i.a. boiling air. It will be noted that for convenience and mechanical simplicity the first high pressure cocurrent condensation stage is combined with the second lower pressure cocurrent condensation stage although the stages could be separated if desired. The partially condensed crude helium is discharged from passageway 63 into conduit 64 and thereafter flows to product helium superheater 65 and passageway 66 therein for further condensation. Final condensation is effected in the third cocurrent condenser 67 at about 67° K. by flowing the partially condensed high pressure crude helium in passageway 68. The latter is further condensed by boiling air at for example 1.7 p.s.i.a. on the shell side of condenser 67. The resulting liquid-gas mixture is discharged from passageway 68 into third separator 69, the resulting high purity helium gas phase being withdrawn therefrom through conduit 70. The high pressure helium product which is now about 99.5% pure is next warmed in the product helium superheater 65 by flow through passageway 71 which is thermally associated with partially condensed crude helium passageway 66. Finally the high pressure helium product is warmed in passageway 72 of high pressure heat exchanger 61 and then fed through conduit 73 and control valve 74 to helium storage containers 75. The liquid air phase is withdrawn from third separator 69 into conduit 76 and preferably divided into two portions, one portion being diverted through branch conduit 77 and throttling valve 78 therein for passage to the shell side of third cocurrent condenser 67 to boil at about 1.7 p.s.i.a. and 63° K. It is then withdrawn through conduit 79 and directed to the low pressure shell side of high pressure heat exchanger 61 for warming to ambient temperature. The sub-atmospheric pressure air fraction is then withdrawn from heat exchanger 61 through conduit 80 and compressed in vacuum pump 81 to atmospheric pressure and mixed with the atmospheric pressure product air stream in conduit 45 downstream of warm leg 17. This mixed stream is consecutively compressed in compressors 46 and 48, cleaned of oil in trap 82 and delivered to product air storage containers 51 as previously described. Returning now to the third separator 69 the remainder of the liquid air from conduit 76 is transferred through conduit 83 and control valve 84 therein to the liquid air storage tank 26.

A contaminant removal system is required to provide clean products to storage and prevent fouling of the cold equipment. This system must remove hydrocarbon, water and carbon dioxide contaminants present in the initial charge of air to for example a wind tunnel and also remove contaminants in the makeup and in-leakage air. Oil from the compressors 13, 46, 48 and 34 is removed in traps 14, 82 and 60, respectively, located downstream of these oil-lubricated compressors. Water is removed from the helium-air feed stream and makeup air entering the primary separation stage through conduit 11 by trap 15 containing for example zeolitic molecular sieve adsorbent material. Most of the carbon dioxide is frozen out on the surfaces of warm leg 17 and cold leg 18, and removed by periodic thawing of these components during idle periods. The remaining carbon dioxide is then removed after the heat exchange zone 16 by adsorbent trap 20. Trace concentrations of carbon dioxide and hydrocarbons in the liquid air are removed in adsorbent trap 85 in passageway 23, trap 86 in the base of liquid air storage tank 26, and trap 87 in the base of second cocurrent condenser 28, at liquid air temperature or below. Trace concentrations of carbon dioxide and volatile hydrocarbons are also removed from the liquid within the third cocurrent condenser 67 in adsorbent trap 88. All low temperature adsorbent traps are preferably incorporated in the appropriate component equipment.

The process of the present invention is intended primarily to handle three specific conditions of helium-air feed composition within certain separation times. However, it is also capable of meeting any intermediate conditions of flow and feed concentration within a reasonable time.

By definition Condition I feed streams cover the range from 0 to 18% helium; Condition II from 18 to 75% helium; and Condition III from 75 to 100% helium. All feed concentrations below 75% helium (i.e. Conditions I and II) are processed in both the primary and secondary separation stages as previously described. When feed concentrations are above 75% helium (Condition III), the feed stream will bypass the primary separation stage and be processed in the secondary separation stage.

The three conditions will now be described in detail.

In Condition I, the feed from the collector spheres 10 is compressed by compressor 13 and then processed in the previously described manner through both the primary and secondary separation systems. Separate helium and air streams at 99.5% purity are compressed to storage at for example 3,000 p.s.i.a. or whatever pressure is desired.

Condition II is met in essentially the same way as Condition I. However since the air product stream in conduit 52 may provide insufficient turbine flow to produce the required low temperature refrigeration, a portion of the air is returned from conduit 45 downstream of booster compressor 48 through bypass conduit 89 and control valve 90 therein for mixing with the helium-air feed stream in conduit 11, and recycling through the primary separation stage. In this event, flow of 90 p.s.i.a. product air through conduit 47 will be reduced to 0. Operation of the secondary separation system will be as previously described, and separate helium and air streams at 99.5% purity are compressed to storage at 3,000 p.s.i.a. or as otherwise desired.

In Condition III feed streams of 75–100% helium bypass the primary separation stage and are processed in the secondary separation stage. Thus the collector feed is compressed in compressor 13, and bypassed directly through conduit 91 and control valve 92 therein to helium booster compressor 34, and processed through the secondary separation stage only. Contaminants are removed in warm adsorbent trap 15 and in cold trap 88, located within the third cocurrent condenser 67. Oil is removed in traps 14 and 60. Recirculated refrigerant air from air booster compressor 48 is returned through conduit 89 and processed in the primary separation stage to provide refrigeration to cool the high pressure stream in second condenser 28 and build liquid air storage in tank 26. Valve 93 downstream of trap 15 and upstream of the juncture with conduit 89 is closed to prevent mixing of recirculated air from conduit 89 with air-helium feed mixtures of 75–99.0% helium from trap 15. Otherwise the operation is as previously described.

If desired, a feed stream of high purity helium, e.g. 99.5%, may bypass the cold sections of the separation unit completely and be processed in the cleanup traps only. To this end, after compression in feed compressor 13, the stream will pass through the warm adsorption trap 15 for moisture removal, through bypass conduit 91 and helium booster compressor 34, oil trap 60, and thence through bypass conduit 94 and control valve 95 therein to communicating conduit 73 and helium storage containers 75. If the helium purity drops below a predetermined value due to improper operation, valve 96 in low purity helium recycle conduit 97 is opened for recycling the product to facilitate reprocessing in the previously described manner.

During certain periods it is necessary to maintain the separation unit in cold standby condition ready to handle feed streams of any desired helium-air concentration as defined by Conditions I, II and III. During this standby Condition IV, air makeup for producing liquid storage is added to the plant feed for either raw air through conduit 98 and control valve 99 therein, or clean air from product air storage containers 51. To this end, conduit 100 communicates with air product storage containers 51 and contains regulator valve 101, the conduit communicating with feed conduit 11. The recycle air flows through low pressure heat exchange zone 16, adsorbent trap 20, first condenser 21 where it is liquefied and through first separator 24 to liquid air storage tank 26. Liquid air is then withdrawn from tank 26 through conduit 35 and communicating conduit 36, throttled through valve 37 into the first condenser 21 at 90 p.s.i.a. where it is boiled, warmed in cold leg 18, expanded to 181 p.s.i.a. in turbine 54, and rewarmed in the low pressure passageways 40 and 41 of cold leg 18 and warm leg 17 respectively. The warmed air is then recompressed in compressors 46 and 48 to 3,000 p.s.i.a., and recirculated through bypass conduit 89 where it is throttled through valve 90 to 165 p.s.i.a. for recirculation through the same cycle. This procedure enables liquid air to be produced and maintained in storage tank 26.

Whenever it is desired to provide clean and dry air makeup into the storage containers 51 during the standby condition, this may be accomplished simply by opening the valve 50 at the containers and diverting the required flow into them instead of through bypass conduit 89 for recirculation.

A charge of air is defined as one fill of the product air in the storage containers 51 at 3,000 p.s.i.a. If desired, several successive charges of raw air may be dried in the adsorbent trap 15 without operating the cold equipment. This raw air is bled from makeup conduit 98 into feed compressor 13, passed through oil trap 14 and adsorbent trap 15, bypassed through conduit 102 and control valve 103 to communicating conduit 47, compressed in air booster compressor 48, cleaned in oil trap 82, and then fed to air product storage containers 51.

During the normal operating cycles raw air is introduced into the equipment by the makeup air and in-leakage into the vacuum system. Therefore, it is necessary to periodically remove by thawing the small quantities of carbon dioxide which are deposited in the heat exchangers. The carbon dioxide may for example be removed by warm and/or cold adsorbent traps prior to its deposition. However, in practicing the present invention it is preferred to allow the carbon dioxide to deposit in the heat exchange passages and then remove such deposits for example, daily, by thawing in a countercurrent flow direction using full air flow capacity through feed compressor 13 and subsequent traps.

Under Condition III operation when the gas feed stream goes directly to the high pressure separation stage, some carbon dioxide will be deposited in the high pressure heat exchanger passageway 62 from ambient in-leakage air. This deposit is removed at weekly intervals by thawing counterflow (from cold to warm end) with warm ambient air from the feed gas compressor 13.

Using the system of periodically thawing components as described above, the entire plant will usually require thawing only semi-annually. This is accomplished by using dry gas recirculated through the cold equipment. The recirculated gas is withdrawn at a cold temperature, heated, and returned until all the equipment is at ambient temperature. Dry air from storage is then used to purge the equipment.

Three components of the high pressure system—third condenser 67, third separtor 69, and product helium superheater 65—operate at about 65° K., which is 14° C. below the dew point of atmospheric pressure air. Unless special precautions are taken, air will condense on the outside of these components due to this dew point relationship. Such condensation would reduce the effectiveness of the insulation and increase heat leak losses. The present invention affords a method for obviating this problem, whereby the ultra cold components processing fluids having dew points below that of air are enclosed in sealed insulation jackets which for example may be filled with low conductive powderous insulation insulation and pressurized slightly with pure helium gas. The helium is preferably regulated at a pressure which is slightly above the pressure of the main or primary insulation casing which for example may enclose all of the low temperature vessels of the plant.

FIG. 2 illustrates the above-described insulating system now to be described in more detail. Starting with the innermost vessel 210 and associated conduits 210a, this chamber may for example correspond to the following components of FIG. 1: product helium superheater 65, third condenser 67, or third separator 69. Vessel 210 and associated conduits 210a having an internal pressure $P_1$ is enclosed by secondary or ultra-low temperature insulating jacket 211 filled with low conductivity material 212 such as perlite (exploded volcanic glass) or silica powder. Insulating jacket 211 is filled preferably with helium gas and regulated at a pressure $P_2$, less than the pressure within ultra-low temperature vessel 210 but above the pressure $P_3$ within the surrounding main insulating casing 213. The ultra-low temperature insulating jacket 211 is prevented from becoming overpressurized by safety valve 214, and the entire assembly is preferably contained within the surrounding insulating casing 213 which preferably also contains at least the other low temperature vessels and their associated piping. Thus, the main insulating casing encloses heat exchangers 17, 18, 61 and 65, cocurrent condensers 21, 28 and 67, separators 24, 30 and 69, liquid air storage tank 26, and adsorption trap 20. Main insulation casing 213 is preferably filled with low conductive powderous material as for example the previously mentioned perlite or silica, and maintained at a slight positive gas pressure $P_3$ by for example purge air or nitrogen entering through bottom conduit 215 and leaving through top conduit 216 having control valve 217 therein. The last mentioned valve may be used as a bleeder means to control the pressure $P_3$ with main casing 213. Suitable overpressure relief means are provided for main casing 213 as for example safety valve 218.

It is to be noted that pressure $P_3$ within main casing 213 is slightly higher than $P_4$, the atmospheric pressure surrounding such casing. Thus, the relationship between the four pressures is as follows: $P_1 > P_2 > P_3 > P_4$. It will be readily understood that the insulating system of the present invention affords substantial advantages when compared with prior art schemes. For example, this system eliminates the necessity of vacuum-insulating the entire casing or covering the very cold parts with gas-tight, foam-in-place insulation, which would be a very expensive system to fabricate and maintain. The present insulating system also eliminates the necessity of using relatively thick layers of insulation with a helium purge and recovery system.

As will now be apparent the present invention affords a highly efficient system for recovering high purity helium from helium-air mixtures, which system represents a substantial improvement over previously proposed and employed arrangements. For example the present system is suitable for separating economically either continuous or intermittent streams covering the complete range of helium-air mixtures into high-purity components, and delivering them as separate streams compressed to any desired pressure. Variable refrigeration requirements resulting from feed stream flow and purity fluctuations are smoothed out by means of a liquid air storage tank comprising one component of the system. This tank permits the production of refrigeration at a continuous fixed rate in excess of the average requirement, and the use of such refrigeration in the form of liquid air as ballast for intermittent refrigeration requirements including brief plant outages.

Power consumption of the present system is relatively low. Initial steps of separation are performed at relatively low pressure (e.g. 165 p.s.i.a.) where helium is most effectively separated from air and only the final step is performed at high pressure (e.g. 3,050 p.s.i.a.) where air is most effectively separated from helium. The feed gas stream is compressed only sufficiently high to permit obtaining necessary refrigeration by work expansion of the air product stream at appropriate temperature levels between the two reboiler pressure levels. This dual pressure arrangement eliminates unnecessary recompression, minimizes the loss of helium due to its solubility within the condensed liquid air and also reduces equipment costs considerably. The size of the vacuum-pump boiling air stream used to refrigerate the final partial condensation recovery step is thereby reduced.

Although the preferred embodiments have been described in detail, it is contemplated that modifications of the process and apparatus may be made and that some features may be employed without others, all within the spirit and scope of the invention as set forth herein.

What is claimed is:

1. A process for separating a helium-air gas mixture into its components comprising the steps of providing an inlet helium-air gas mixture at a first pressure; cooling such gas mixture to its dew point at said first pressure; cocurrently partially condensing the cooled gas mixture; separating the partially condensed mixture into a helium-enriched gas phase and a first air-enriched liquid phase; further cocurrently partially condensing said helium-enriched gas phase; separating the further partially condensed mixture into a helium-further enriched gas phase and a second air-enriched liquid phase; partially throttling said first air-enriched liquid phase and passing at least part of such partially throttled fluid in heat exchange with said cooled gas mixture for at least the first cocurrent partial condensation step, thereby evaporating such fluid; separately passing the evaporated partially throttled air-enriched fraction and said helium-further enriched gas phase in countercurrent heat exchange with the helium-air inlet gas mixture to provide at least part of the refrigeration for the cooling step to the gas mixture dew point; withdrawing at an intermediate thermal level, at least part of the evaporated partially throttled air-enriched fraction from said countercurrent heat exchange and work expanding such fraction with the production of low temperature refrigeration; returning the work expanded fraction to said countercurrent heat exchange for separate cooling of the inlet gas mixture; withdrawing from the warm end of said countercurrent heat exchange, the warmed helium further enriched gas phase as a crude helium product and the air-enriched fraction as the air product of the separation.

2. A process according to claim 1 in which at least part of said first air-enriched and second air-enriched liquid phases are stored at low temperature and periodically withdrawn from liquid storage for said cocurrent partial condensation and countercurrent heat exchange when additional refrigeration is required therein.

3. A process according to claim 1 in which said first air-enriched product fraction is recompressed and at least partially recycled to the inlet helium-air gas mixture stream so as to increase the quantity of low temperature refrigeration produced in the work expansion step.

4. A process according to claim 1 in which at least part of said first air-enriched and second air-enriched liquid phases are stored at low temperature and periodically withdrawn from liquid storage for said cocurrent partial condensation and countercurrent heat exchange when additional refrigeration is required therein; and said first air-enriched product fraction is recompressed and at least partially recycled to the inlet helium-air gas mixture stream so as to increase the quantity of low temperature refrigeration produced in the work expansion step.

5. A process according to claim 1 including the steps of further compressing the crude helium product to a second pressure which is higher than said first pressure; cooling such crude helium to its dew point; cocurrently partially condensing the cooled crude helium; separating the partially condensed crude helium into a helium gas phase and a third air-enriched liquid phase; passing said helium gas phase in countercurrent heat exchange with said crude helium so as to provide at least part of the refrigeration required to cool the crude helium to its dew point; and withdrawing the warmed helium gas phase from said countercurrent heat exchange at substantially said second pressure as a helium product of the separation.

6. A process according to claim 5 in which at least part of said third air-enriched liquid phase is throttled and directed to the crude helium cocurrent partial condensation step as the refrigerant therefor, the third air-enriched liquid being evaporated therein and thereafter passed in countercurrent heat exchange with said crude helium so as to provide the balance of refrigeration required to cool the crude helium to its dew point.

7. A process according to claim 5 including the steps of throttling at least part of said third air-enriched liquid phase to below atmospheric pressure, directing such throttled fluid to the crude helium cocurrent partial condensation step as refrigerant therefor and being simultaneously evaporated therein, passing the evaporated third air-enriched portion in countercurrent heat exchange with said crude helium so as to provide the balance of refrigeration required to cool the crude helium to its dew point, recompressing the resulting warmed third-enriched air portion to at least atmospheric pressure, and mixing such recompressed stream with said air-enriched portion from the helium-air inlet gas mixture countercurrent heat exchange step so as to form a combined air product of the separation.

8. A process according to claim 5 in which at least part of said first air-enriched, second air-enriched and third air-enriched liquid phases are stored at low temperature and withdrawn from liquid storage for heat exchange with said cooled crude helium so as to effect the cocurrent partial condensation thereof, the air-enriched fluid being simultaneously evaporated and thereafter passed in countercurrent heat exchange with the helium-air inlet gas mixture as part of the cooling step to the gas mixture dew point.

9. A process according to claim 8 in which the work expanded air-enriched fraction is mixed with the evaporated air-enriched fluid for said countercurrent heat exchange with the helium-air inlet gas mixture.

References Cited in the file of this patent

UNITED STATES PATENTS

| | | |
|---|---|---|
| 1,569,943 | Bottoms | Jan. 19, 1926 |
| 1,676,225 | Tolman | July 3, 1928 |
| 1,693,052 | Roberts | Nov. 27, 1928 |
| 1,821,540 | Bottoms | Sept. 1, 1931 |
| 1,962,176 | De Baufre | June 12, 1934 |
| 2,012,080 | De Baufre | Aug. 20, 1935 |
| 2,315,424 | Hill | Mar. 30, 1943 |
| 2,587,820 | Cartier | Mar. 4, 1952 |
| 2,633,717 | Paget | Apr. 7, 1953 |
| 2,896,414 | Tung | July 28, 1959 |
| 2,938,934 | Williams | May 31, 1960 |